(12) United States Patent
Adler et al.

(10) Patent No.: US 8,595,042 B2
(45) Date of Patent: *Nov. 26, 2013

(54) PROCESSING OF PROVENANCE DATA FOR AUTOMATIC DISCOVERY OF ENTERPRISE PROCESS INFORMATION

(75) Inventors: Sharon C. Adler, East Greenwich, RI (US); Francisco P. Curbera, Hastings on Hudson, NY (US); Yurdaer N Doganata, Chestnut Ridge, NY (US); Chung-Sheng Li, Scarsdale, NY (US); Axel Martens, White Plains, NY (US); Kevin P. McAuliffe, Yorktown Heights, NY (US); Huong Thu Morris, Ridgefield, CT (US); Nirmal K. Mukhi, Ramsey, NJ (US); Aleksander A. Slominski, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,734

(22) Filed: Mar. 20, 2012

(65) Prior Publication Data
US 2012/0179510 A1 Jul. 12, 2012

Related U.S. Application Data

(63) Continuation of application No. 12/265,975, filed on Nov. 6, 2008, now Pat. No. 8,229,775.

(51) Int. Cl.
*G06Q 10/00* (2012.01)
(52) U.S. Cl.
USPC .......................................... 705/7.11

(58) Field of Classification Search
USPC ....................................................... 705/7.11
See application file for complete search history.

(56) References Cited

U.S. PATENT DOCUMENTS

| 6,138,121 | A | 10/2000 | Costa et al. |
| 6,236,994 | B1 | 5/2001 | Swartz et al. |
| 6,278,977 | B1 | 8/2001 | Agrawal et al. |
| 6,604,114 | B1 | 8/2003 | Toong et al. |
| 6,763,353 | B2 * | 7/2004 | Li et al. ........................ 719/320 |
| 6,920,474 | B2 * | 7/2005 | Walsh et al. .................. 709/200 |
| 7,039,953 | B2 | 5/2006 | Black et al. |

(Continued)

OTHER PUBLICATIONS

Simmhan et al (A Survey of Data Provenance in e-Science), Sep. 2005, SIGMOD Record, vol. 34, No. 3, pp. 31-36.*

(Continued)

*Primary Examiner* — Romain Jeanty
(74) *Attorney, Agent, or Firm* — William Stock; Ryan, Mason & Lewis, LLP (57) ABSTRACT

Techniques are disclosed for capturing, storing, querying and analyzing provenance data for automatic discovery of enterprise process information. For example, a computer-implemented method for managing a process associated with an enterprise comprises the following steps. Data associated with an actual end-to-end execution of an enterprise process is collected. Provenance data is generated based on at least a portion of the collected data, wherein the provenance data is indicative of a lineage of one or more data items. A provenance graph that provides a visual representation of the generated provenance data is generated, wherein nodes of the graph represent records associated with the collected data and edges of the graph represent relations between the records. The generated provenance graph is stored in a repository for use in analyzing the enterprise process.

22 Claims, 8 Drawing Sheets

(56) References Cited

U.S. PATENT DOCUMENTS

| | | | |
|---|---|---|---|
| 7,143,392 B2 * | 11/2006 | Ii et al. .......................... 717/125 |
| 7,200,563 B1 | 4/2007 | Hammitt et al. |
| 7,668,726 B2 | 2/2010 | Cardno et al. |
| 2002/0165745 A1 | 11/2002 | Greene et al. |
| 2003/0120528 A1 | 6/2003 | Kruk et al. |
| 2003/0144868 A1 | 7/2003 | MacIntyre et al. |
| 2004/0107124 A1 | 6/2004 | Sharpe et al. |
| 2004/0174397 A1 | 9/2004 | Cereghini et al. |
| 2005/0071207 A1 | 3/2005 | Clark et al. |
| 2005/0278273 A1 | 12/2005 | Uthe |
| 2006/0123022 A1 | 6/2006 | Bird |
| 2006/0149589 A1 | 7/2006 | Wager |
| 2006/0184410 A1 | 8/2006 | Ramamurthy et al. |
| 2006/0242180 A1 | 10/2006 | Graf et al. |
| 2006/0253477 A1 | 11/2006 | Maranhao |
| 2006/0277523 A1 | 12/2006 | Horen et al. |
| 2007/0088957 A1 | 4/2007 | Carson |
| 2007/0156478 A1 | 7/2007 | Breene et al. |
| 2007/0266166 A1 | 11/2007 | Cohen et al. |
| 2007/0276711 A1 | 11/2007 | Shiu et al. |
| 2007/0283417 A1 | 12/2007 | Smolen et al. |
| 2007/0288479 A1 | 12/2007 | Howard et al. |
| 2008/0040181 A1 | 2/2008 | Freire et al. |
| 2008/0077530 A1 | 3/2008 | Banas et al. |
| 2008/0082377 A1 | 4/2008 | Kennis et al. |
| 2008/0103749 A1 | 5/2008 | Mead |
| 2008/0103854 A1 | 5/2008 | Adam et al. |
| 2008/0120281 A1 | 5/2008 | Marceau et al. |
| 2008/0126042 A1 | 5/2008 | Kim |
| 2008/0126399 A1 | 5/2008 | MacGregor |
| 2009/0281865 A1 | 11/2009 | Stoitsev |
| 2009/0292818 A1 | 11/2009 | Blount et al. |
| 2010/0082331 A1 | 4/2010 | Brun et al. |

OTHER PUBLICATIONS

Altintas et al (Provenance Collection Support in the Kepler Scientific Workflow System), Dec. 2006, L. Moreau and I. Foster (Eds): IPAW, pp. 118-132.*

T. Gibson et al., "Application of Provenance for Automated and Research Driven Workflows," Pacific Northwest National Laboratory, 8 pages.

I. Altintas et al., "Provenance Collection Support in the Kepler Scientific Workflow System," IPAW 2006, 15 pages.

E. Petrinja et al., "A Provenance Data Management System for Improving the Product Modeling Process," Automation in Construction, 2006, 13 pages.

"BPM for Compliance to Reduce Risk, Time, and Cost," Global 360, Optimizing Business Processes, 2005, 12 pages.

http://theory.stanford.edu/~amitp/GameProgramming/AStarComparison.html#S2, 2009, 8 pages.

J. Freire et al., "Provenance for Computational Tasks: A Survey," IEEE Computing is Science & Engineering, May/Jun. 2008, pp. 20-30, vol. 10, No. 3.

Y.L. Simmhan et al., "A Survey of Data Provenance in e-Science," SIGMOD Record, Sep. 2005, pp. 31-36, vol. 34, No. 3.

R. Boss et al., "Lineage Retrieval for Scientific Data Processing: A Survey," ACM Computing Surveys, Mar. 2005, vol. 37, No. 1, pp. 1-28.

A-W. Scheer et al., "ARIS Architecture and Reference Models for Business Process Management," 2000, pp. 366-379.

W.M.P. Van Der Aalst et al., "Workflow Patterns," Distributed and Parallel Databases, Jul. 2003, pp. 1-70, vol. 14, No. 3.

"BPM Process Patterns," Fuego BPM White paper, http://edocs.bea.com/albsi/docs55/pdfs/BPM/%20Process%20Patterns%20White%20Paper.pdf, Jan. 2006, 25 pages.

S. Ceri et al., "What You Always Wanted to Know About Datalog (and Never Dared to Ask)," IEEE Transactions on Knowledge and Data Engineering, http://doi.ieeecomputersociety.org/10.1109/69.43410, 1989, pp. 146-166, vol. 1, No. 1.

L. Moreau et al., "The Open Provenance Model," Dec. 2007, pp. 1-26.

Y.L. Simmhan et al., "A Framework for Collecting Provenance in Data Centric Scientific Workflows," Proceedings of the IEEE International Conference on Web Services (ICWS), Sep. 2006, 8 pages.

U.S. Appl. No. 12/265,986, filed in the name of Sharon C. Adler et al. on Nov. 6, 2008 and entitled "Validating Compliance in Enterprise Operations Based on Provenance Data."

U.S. Appl. No. 12/265,993, filed in the name of Sharon C. Adler et al. on Nov. 6, 2008 and entitled "Extracting Enterprise Information Through Analysis of Provenance Data."

U.S. Appl. No. 12/266,052, filed in the name of Sharon C. Adler et al. on Nov. 6, 2008 and entitled "Influencing Behavior of Enterprise Operations During Process Enactment Using Provenance Data."

* cited by examiner

PROCESSING OF PROVENANCE DATA FOR AUTOMATIC DISCOVERY OF ENTERPRISE PROCESS INFORMATION

CROSS REFERENCE TO RELATED APPLICATIONS

This application is a Continuation of U.S. patent application Ser. No. 12/265,975 filed on Nov. 6, 2008, now U.S. Pat. No. 8,229,775, the disclosure of which is fully incorporated herein by reference.

The present application is related to: (i) U.S. patent application Ser. No. 12/265,986, filed on Nov. 6, 2008, entitled "Validating Compliance in Enterprise Operations Based On Provenance Data;" (ii) U.S. patent application Ser. No. 12/265,993, filed on Nov. 6, 2008, entitled "Extracting Enterprise Information through Analysis of Provenance Data;" and (iii) U.S. patent application Ser. No. 12/266,052, filed on Nov. 6, 2008, entitled "Influencing Behavior of Enterprise Operations During Process Enactment Using Provenance Data," the disclosures of which are incorporated by reference herein in their entirety.

FIELD OF THE INVENTION

The present invention relates to provenance data and, more particularly, to techniques for capturing, storing, querying and analyzing provenance data for automatic discovery of enterprise process information.

BACKGROUND OF THE INVENTION

Today's enterprise applications span multiple systems and organizations, integrating legacy and newly developed software components to deliver value to enterprise operations. Often enterprise processes rely on human activities that may not be predicted in advance, and information exchange is heavily based on e-mails or attachments where the content is unstructured and needs discovery. Visibility of such end-to-end operations is required to manage compliance and enterprise performance.

Hence, it becomes necessary to develop techniques for tracking and correlating the relevant aspects of enterprise operations as needed without the cost and overhead of a full-fledged data and process reengineering effort.

SUMMARY OF THE INVENTION

Illustrative embodiments of the invention provide techniques for capturing, storing, querying and analyzing provenance data for automatic discovery of enterprise process information.

For example, in one embodiment, a computer-implemented method for managing a process associated with an enterprise comprises the following steps. Data associated with an actual end-to-end execution of an enterprise process is collected. Provenance data is generated based on at least a portion of the collected data, wherein the provenance data is indicative of a lineage of one or more data items. A provenance graph that provides a visual representation of the generated provenance data is generated, wherein nodes of the graph represent records associated with the collected data and edges of the graph represent relations between the records. The generated provenance graph is stored in a central repository for use in analyzing the enterprise process.

Advantageously, illustrative embodiments of the invention provide a generic data model and middleware infrastructure to collect and correlate information about how data was produced, what resources were involved and which tasks were executed. Enterprise provenance gives the flexibility to selectively capture information required to address a specific compliance or performance goal. Additionally, a powerful correlation mechanism, as is provided by illustrative embodiments of the invention, yields a representation of the end-to-end operation (full lifecycle) that puts each enterprise artifact into the correct context, for example, to detect situations of compliance violations and find their root causes.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like. Thus, "enterprise processes" are processes that the enterprise performs in the course of attempting to achieve that purpose. By way of one example only, enterprise processes may comprise business processes.

As used herein, the term "provenance" is understood to broadly refer to an indication or determination of where something, such as a unit of data, came from or an indication or determination of what it was derived from. That is, the term "provenance" refers to the history or lineage of a particular item. Thus, "provenance information" or "provenance data" is information or data that provides this indication or results of such determination. By way of one example only, enterprise provenance data may comprise business provenance data.

It has been realized that actual enterprise operations often differ from their original design resulting in enterprise integrity lapses and compliance failures with significant penalties. The cost of compliance with regulatory mandates such as HIPAA (Health Insurance Portability and Accountability Act) or the Sarbanes-Oxley Act has been higher than most companies expected. According to a survey, an average Fortune 1000 company spent more than $2 million and logged more than 10,000 hours of compliance assurance work in 2005.

It has therefore been realized that, in order to reduce the cost of compliance assurance, companies should seek to automate manual process controls and reduce the amount of internal and consulting labor. Further, it is realized that compliance solutions should be an integral part of organization's enterprise process and enable a proactive approach to reduce risk. Such a solution should not rely merely on enterprise models but should be based on the actual execution trace of end-to-end enterprise operations. This way, operational aspects of the enterprise are captured, operational risks are measured, compliance to enterprise rules and regulations can be assured, risk points are identified and actions are taken for remediation.

It is also realized that tracking provenance as part of enterprise process management is particularly important in the area of compliance, where the majority of spending goes to the labor of auditors and consultants to document and track the lineage of business tasks and items. Thus, generation and use of enterprise provenance data provides the traceability of end-to-end enterprise operations (i.e., a full lifecycle) in a flexible and cost effective way.

Provenance helps to understand what actually happened during the lifecycle of a process by examining how data is produced, what resources are involved and which tasks are invoked. Accurate tracking of the lineage of the process executions is essential to determine the root cause of compliance failures, but as computers get faster and applications become more complex, tracking and processing large volumes of data is an expensive proposal. Fortunately, in case of a specific compliance problem or to achieve a particular performance goal, it is not necessary to track all the events. The provenance of relevant data can be identified and tracked selectively in order to reduce the complexity of the solution.

We define an enterprise provenance approach as one that comprises capturing and managing the lineage of enterprise artifacts to discover functional, organizational, data and resource aspects of an enterprise. Examining enterprise provenance data gives insight into the chain of cause and effect relations and facilitates understanding the root causes of the resultant event.

In one embodiment of the invention, our approach comprises the following steps: (1) identifying the control points, relevant enterprise artifacts and required correlations; (2) probing the actual execution of the enterprise process to collect data; (3) correlating and enriching the collected data and the relations among them to create a provenance graph; (4) analyzing aggregated information to enable enterprise activity monitoring or to interfere with the execution by generating alerts; and (5) providing access to information stored in the graph for detailed investigation and root cause analysis.

Figure 1:
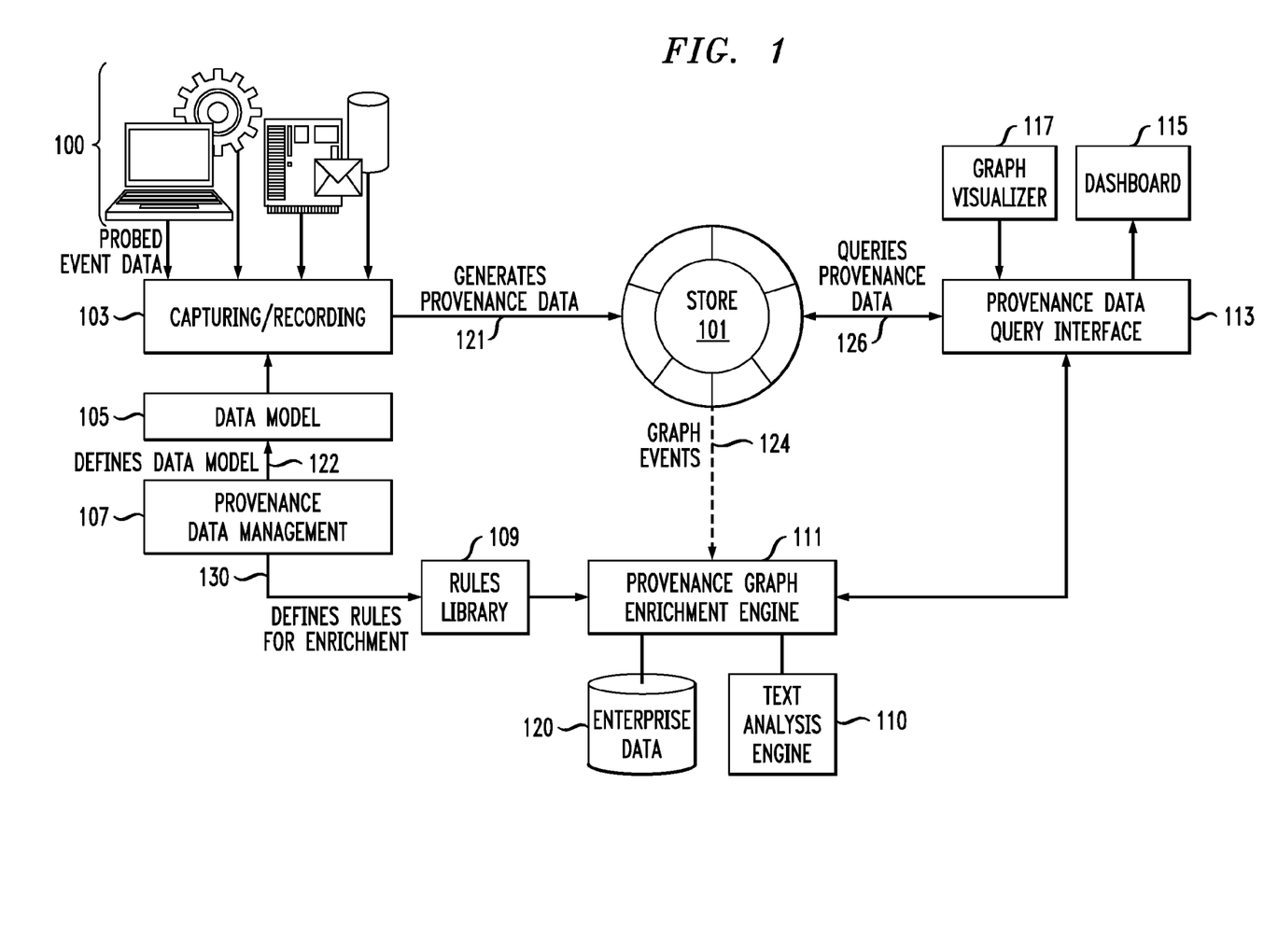
FIG. 1 illustrates a system for processing provenance data for automatic discovery of enterprise process information, according to an embodiment of the invention.

FIG. 1 shows a system for capturing and processing provenance data for automatic discovery of enterprise process information, according to an embodiment of the invention. The enterprise process information discovery system comprises storage unit 101, multi-capturing/recording components 103, provenance data management sub-system 107, rules library 109, provenance graph enrichment engine 111, text analysis engine 110, enterprise data repository 120, provenance data query interface 113, graph visualizer 117 and dashboard 115.

The provenance data management component 107 supports the specification of the provenance data model 105, i.e., the list of enterprise objects to be captured and the level of details. It is also used to define the correlation rules between two data records. Capturing/recording components 103 are used to capture, process, and reformat application events of the underlying information system 100 (including, for example, computers, servers, repositories, email systems and other enterprise systems) and record the meta-data of enterprise operations into the provenance store. Hence, capturing/recording components 103 map the captured event data onto the data model defined (122) by provenance data management component 107. The information is then transferred (121) to storage unit 101, which is the store for provenance data.

Provenance data management component 107 generates rules (130) that are stored in rules library 109 for provenance graph enrichment engine 111. The rules define a correlation between the enterprise artifacts which is then used to connect them in the provenance graph representation.

Provenance graph enrichment engine 111 links and enriches the collected data to produce the provenance graph. To do so, provenance graph enrichment engine 111 accesses (126) the content of the provenance store 101 through provenance data query interface 113 as well as the original enterprise data. It also employs text analysis engine 110 to discover relationships among data records by analyzing the unstructured text contained in some of the data records. As an example, the analysis of e-mail may reveal that it is a rejection and is used to establish a link between the e-mail and an approval task.

The enriched enterprise data is accessed through query interface 113 and is used to display information about actual enterprise operations. This can be done in one of several ways. One way is to deploy a query into the provenance store which emits the results in real-time, feeding an existing dashboard 115 in order to display key performance indicators as an example. Secondly, a query front-end enables visualization and navigation through the provenance graph by using graph visualizer component 117.

The central component of the architecture is data store 101 where the provenance graph and the associated data records are kept. When the probed event data coming from the runtime systems 100 is transformed into provenance data by capturing/recording component 103, they are written to the store through a database connection (121). As new data are captured and recorded, provenance graph enrichment engine 111 is notified via connection 124. Provenance graph enrichment engine 111 examines the new data records and run associated rules from the rules library, utilizes the existing enterprise data as well as text analysis engine 110 to determine a possible correlation. If new data items or relations are discovered, they are written to the province store via query interface 113.

Ensuring compliance through the information system 100 requires laying out a data model that covers the relevant aspects of the enterprise operations. Creating a data model is the first step to bridge enterprise operations to information systems. The data model should support relevant and salient aspects of the enterprise.

Figure 2:
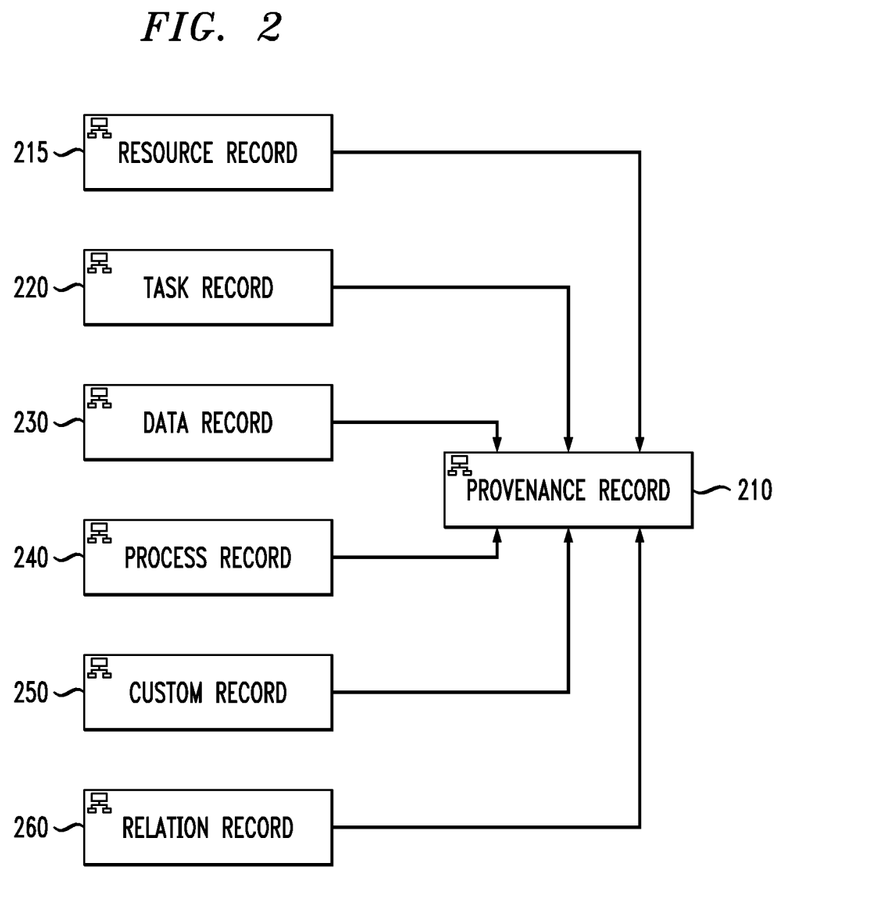
FIG. 2 illustrates a provenance record, according to an embodiment of the invention.

FIG. 2 illustrates a comprehensive, generic data model that can be extended to meet the domain specific needs. As shown, the data of enterprise artifacts stored in the provenance store, depicted as Provenance Record 210, falls into one of the following five dimensions or classes:

Data Record 230: A data record is the representation of an enterprise artifact that was produced or changed during execution of an enterprise process. Typically, those artifacts include documents, e-mails, and database records. In the provenance store, each version of such an artifact is represented separately.

Task Record 220: A task record is the representation of the execution of one particular task. Such task might be part of a formally defined enterprise process or be stand alone; it might be fully automated or manual.

Process Record 240: A process record represents one instance of a process. In automated enterprise management systems, tasks are executed by processes. Hence, each task is associated to the corresponding process record.

Resource Record 215: A resource record represents a person, a runtime or a different kind of resource that is relevant to the selected scope of enterprise provenance, e.g., as actor of a particular task.

Custom Records 250: Custom records provide the extension point to capture domain specific, mostly virtual artifacts such as compliance goals, alerts, checkpoints, etc. This will be explained in greater detail below.

These five classes of records represent the nodes of the provenance graph. To define the correlation between two records, Relation Records 260 represent the edges. These are the records generally produced as a result of relation analysis among the collected records. For simplicity of explanation, we only consider binary relations between records. However, relations between relation records are possible and such higher degree relation could be expressed in accordance with illustrative principles of the invention. Some relations are rather basic on the IT (information technology) level, such as the read and write between tasks and data. Other relations are derived from the context, such as that between manager and achieved challenge.

As mentioned above, the inventive enterprise provenance solution provides a generic data model that can be extended to meet the application domain specific needs.

Figure 3:
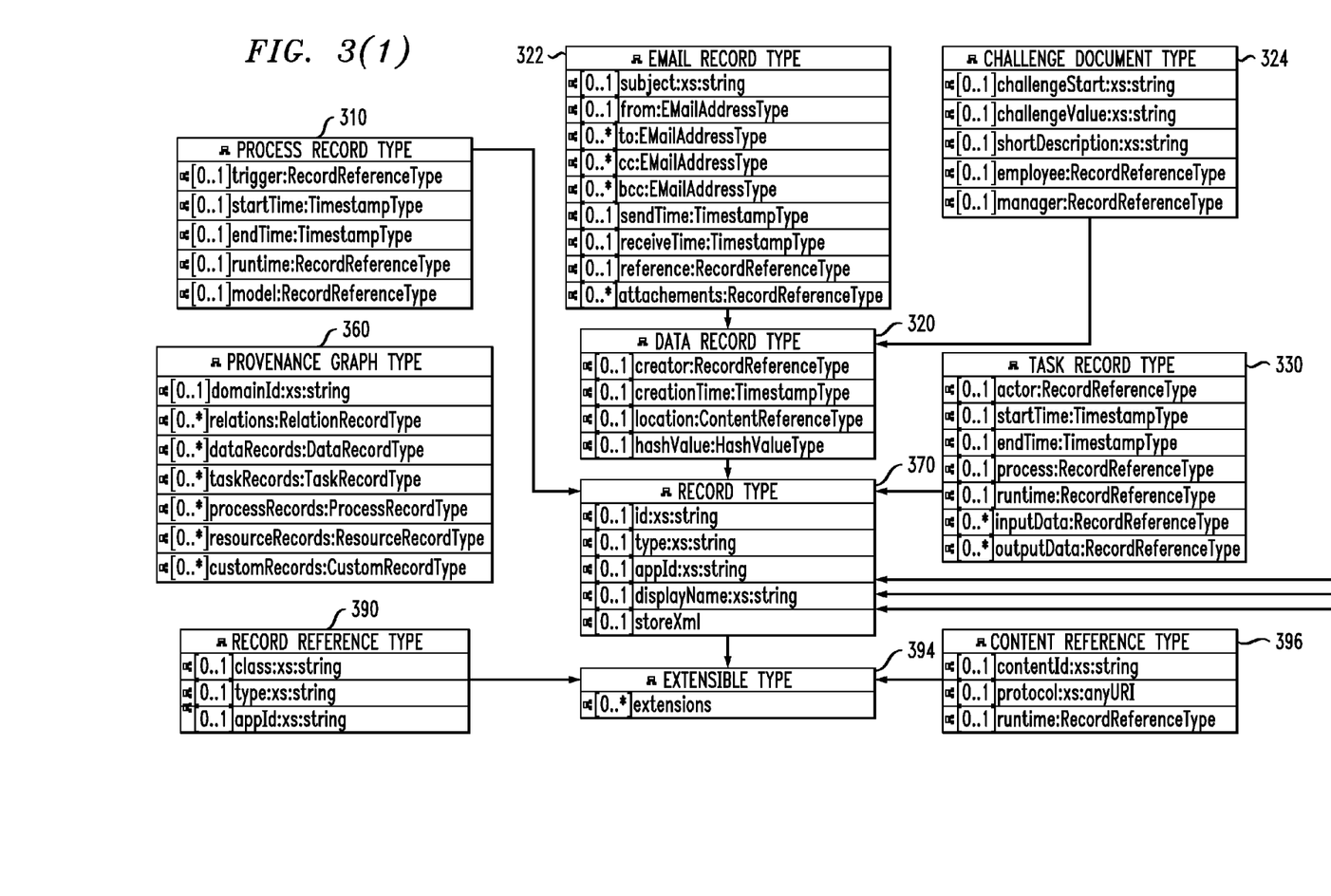
FIG. 3 illustrates a provenance data model, according to an embodiment of the invention.

FIG. 3 depicts the UML (Unified Modeling Language) representation of the provenance graph data model. Basically, the provenance graph comprises six different sets of records, namely, Process 310, Data 320, Task 330, Resource 340, Relation 380 and Custom 350 record types. Each record is an extensible XML data structure and all records share common attributes: id and type are used to identify and classify the record within the graph; the appId (application specific id) and display name refer to characteristics of the corresponding enterprise artifact. These attributes are inherited from a parent record type, RecordType 370. Data, task and process records are added to the provenance graph as the business operations are executed. Resource and custom records are often added after the fact by analytics. Those five record classes represent the nodes of the provenance graph. A semantic relation between two enterprise artifacts is expressed by an edge between the corresponding nodes materialized as a relation record. FIG. 3 shows several specializations of the basic record types. The challenge document and key control point type, however, are specific to a particular application.

ProcessRecordType 310 is differentiated from the other record types by trigger, startTime, endTime, runtime and model attributes. DataRecordType 320, on the other hand, has creator, creationTime, location, hashValue attributes. These attributes are consistent with the original purpose of having these records in the graph. In FIG. 3, two data record types are exemplified which are specific to a particular application; EmailRecordType 322 and ChallengeDocumentType 324. Email record type contains all the attributes necessary to represent an e-mail document such as subject, from, to, cc, bcc, sendTime, receiveTime, reference, attachments while ChallengeDocumentType represents an application specific document attributes.

Relations connect to provenance records. Hence, a RelationRecordType 380 has source and target attributes. Various other relation types are also depicted as extensions of RelationRecordType in 382.

In order to keep the data model generic and flexible, CustomRecordType 350 is introduced and KeyControlPointType 352 is shown as an example to a custom record type. KeyControlPointType 352 is used to relate records to a particular compliance control point. ProvenanceGraphType 360 is introduced to represent the attributes of the graph which are listed as relations, dataRecords, taskRecords, processRecords, resourceRecords, customRecords. In addition to the graph attributes, the domainId attribute is introduced to specify the particular domain for which this provenance graph is generated. EmployeeRecordType 344 contains the attributes that define an employee within the organization. These attributes are listed as an email address, a userid, indicator of being a manager or not, the name of employee's manager and employee's role in executing the tasks. A recordType 370 is the parent of all record types from where they inherit id, type, application id, display name and xml attributes. The children of recordType 370 are ProcessRecordType 310, DataRecordType 320, TaskrecordType 330, CustomRecordType 350 and RelationRecordType 370, as mentioned previously. Following the concept of object oriented modeling, ExtensibleType 394 can be considered the ancestor of all types which has three children, namely, RecordType (370), RecordReferenceType (390) and ContentReferenceType (396). ExtensibleType passes one attribute, extensions, to the children. This attribute gives flexibility to have multiple extensions of the same model. The content and record reference types, ContentReferenceType 396 and RecordReferenceType 390 are used to refer to the location of actual data. Note that the provenance graph is a meta-information repository and the actual data resides within the enterprise at the addresses specified in record and content reference types. Resource RecordType (340) has two children. That is, there are two kinds of resource records, employees and machines These are the entities that activate task items. In the model, employee resource is represented by EmployeeRecordType 344 and machine resources are represented as RuntimeRecordType (346).

In order to demonstrate how a provenance graph captures various aspects of the enterprise, we take a closer look at a sample scenario related to distribution of variable compensation of sales employees. Our example represents a simplified version of the actual process seen in a customer engagement. The process can be described as follows: A sales employee receives commissions for the generated revenue or profit as variable part of his income. To align these incentives specifically to the line of business, geography, and individual situation of the employees, managers create challenges. A challenge is a document that describes in detail each sales target and the associated compensation. If an employee is able to provide evidence about the achievement of a particular challenge, commission is added to his next payment statement as an incentive.

Figure 4A:
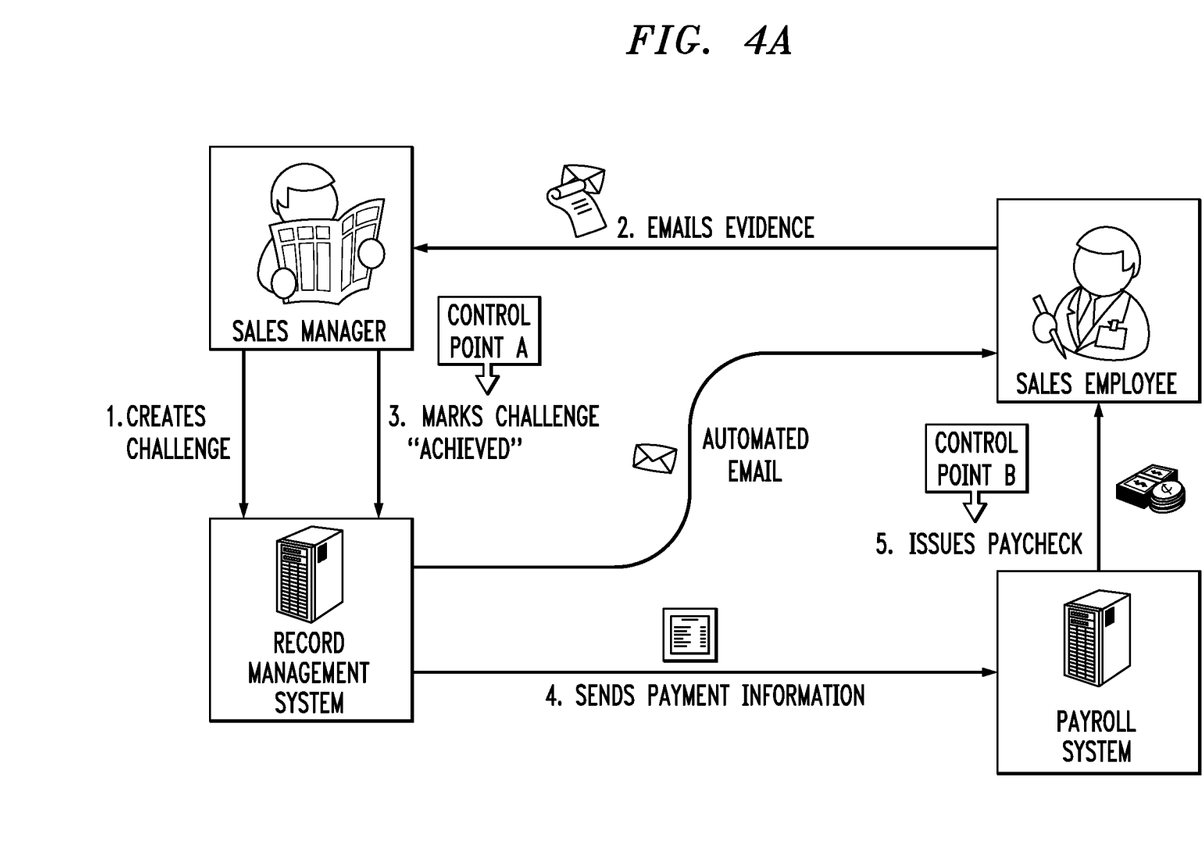
FIG. 4A illustrates an enterprise application scenario used to generate sample provenance graph, according to am embodiment of the invention.

Although from modeling point of view there is one end-to-end process instance that spans all activities from the creation of a particular challenge to the issuance of the corresponding payment statement, in practice, various distributed systems are involved in the execution of the process. Processing structured as well as unstructured documents and running formal sub-processes as well as ad-hoc tasks increases the operational complexity. FIG. 4A illustrates this scenario.

In the first step, the manager creates the challenge (1) using a Web-front-end to the central record management system. This task triggers an automated email informing the employee about the challenge. To claim the achievement, the employee has to provide evidence (2)—which can take various forms: a contract or receipt, a fax from the sales customer, a pointer to a different revenue database, etc. Typically, the evidence is available electronically and it is attached to an e-mail sent to his manager by the employee. Upon reviewing the evidence, the manager evaluates the challenge and, in case of achievement, marks its status (3). Periodically, the latest achievement data is collected and fed into the payroll system (4). Finally, the paycheck is issued to the employee (5).

In order to assure the compliance of the overall process with legal accounting regulations, various control points are introduced. Each control point reflects one locally verifiable requirement is validated today manually for a small number of sampled transactions by internal and/or external auditors. Typically, control points are established for the interaction of various systems and the verification of the control point requires the correlation of structured and/or unstructured data. In FIG. 4A, the two control points are shown. Control point A requires the manager to obtain, evaluate carefully, and maintain the evidence of any achieved challenge. Control point B requires the paycheck to reflect the accumulated commissions correctly.

To verify control point A, an auditor selects an achieved challenge, requests the evidence, and compares the sales targets with the documented achievements. This seemingly simple task has proven to be quite complicated in practice. Firstly, the evidence is not directly linked to the challenge. In some cases, it is not even stored in a central repository but kept locally by the manager. The auditor therefore has to contact the manager, and the manager has to find the right documents. Our observations have shown compliance failure rate of 70%, largely because the evidence could not be located. Also, we have observed lengthy email exchanges between an auditor and a manager until the correct evidence could be identified. As a result of this cumbersome process, only a small fraction of the total number of transactions can be sampled, which implies a high number of undetected questionable situations and possibly fraud. In addition, there had been no support available to track down the root-cause once a questionable situation was detected. This is a major drawback of the existing auditing method. To enable an enterprise to prevent future wrongdoing or simply to detect a pattern of fraudulent behavior, it is essential to answer the following question: "Why did this happen?" Our proposed enterprise provenance approach targets exactly this question.

In the given example, one might argue that the process is not well designed. But regardless how carefully an application is architected, there will always be gaps between the different systems involved, there will always be data that does not fit into predefined forms, and there will always be exceptions in the execution. Rather than requiring a full scale, heavyweight data integration, our approach focuses on the recording of meta-data of relevant objects and events into a centralized and easily accessible store with links into the original systems; the automated correlation of those meta-data to establish execution traces, versioning histories, and other relevant relations; and finally the deep analysis to detect situations after the fact, raise alerts while monitoring continuously, and even interfere with the execution to prevent compliance violations.

Figure 4B:
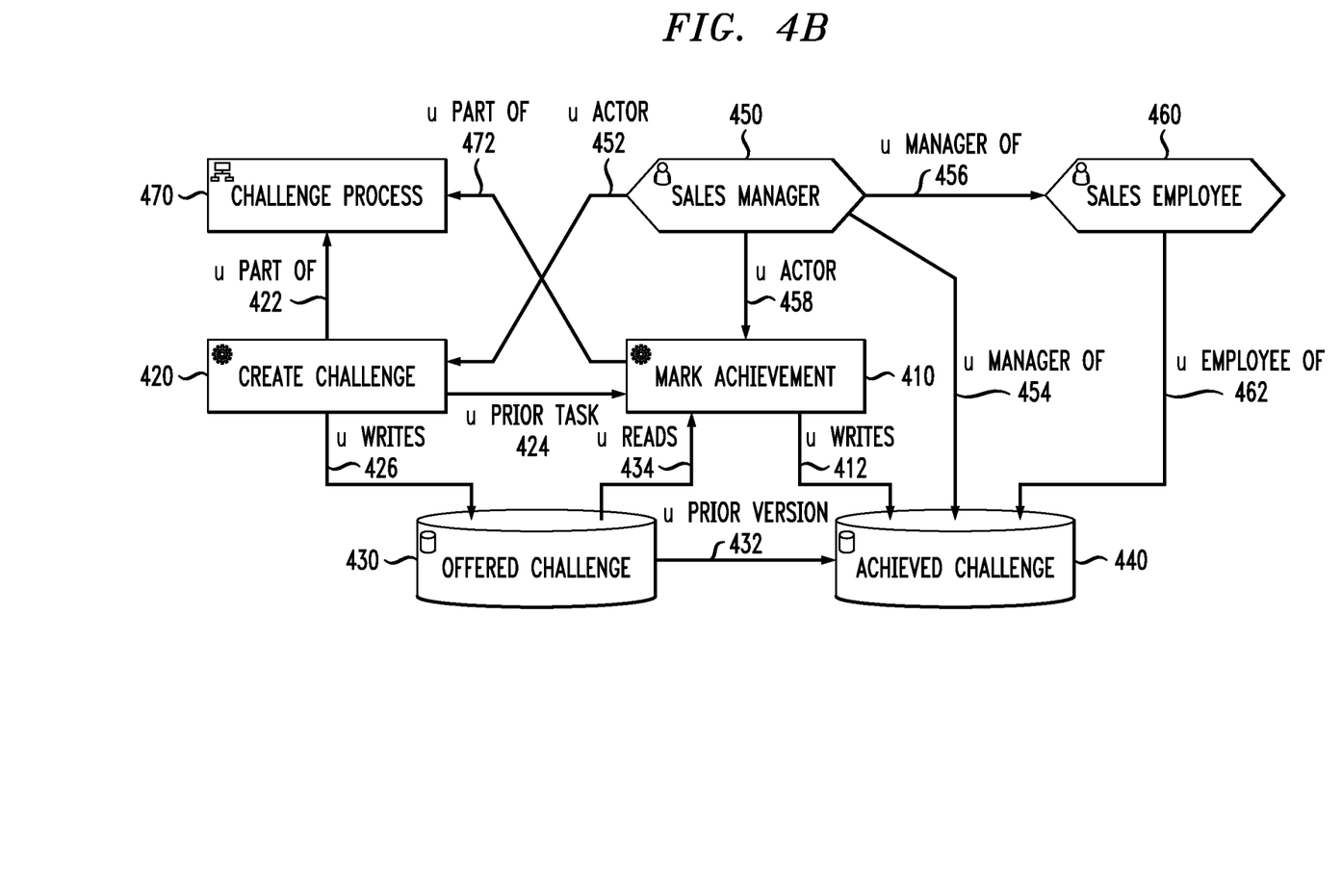
FIG. 4B illustrates a provenance graph extracted from an enterprise scenario, according to an embodiment of the invention.

FIG. 4B depicts the provenance graph for the scenario explained above. The relevant enterprise artifacts and their relations with respect to the scenario are illustrated. DataRecord types are identified by cylindrical shapes while ResourceRecord types are hexagonal, and TaskRecord types are rectangular. Thus, with respect to the scenario in FIG. 4A, the corresponding task records are represented in FIG. 4B as ChallengeProcess node 470, CreateChallenge node 420, and MarkAchievenment node 410. Further, the corresponding resource records are represented as SalesManager node 450 and SalesEmployee node 460. Corresponding data records are represented as OfferedChallenge node 430 and AchievedChallenge node 440. The diamond shapes on the edges between nodes represent the corresponding relation records: partOf 422, writes 426, prior Version 432, reads 434, priorTask 424, actor 452, partOf 472, actor 458, managerOf 454, writes 412, managerOf 456, employeeOf 462.

Figure 4C:
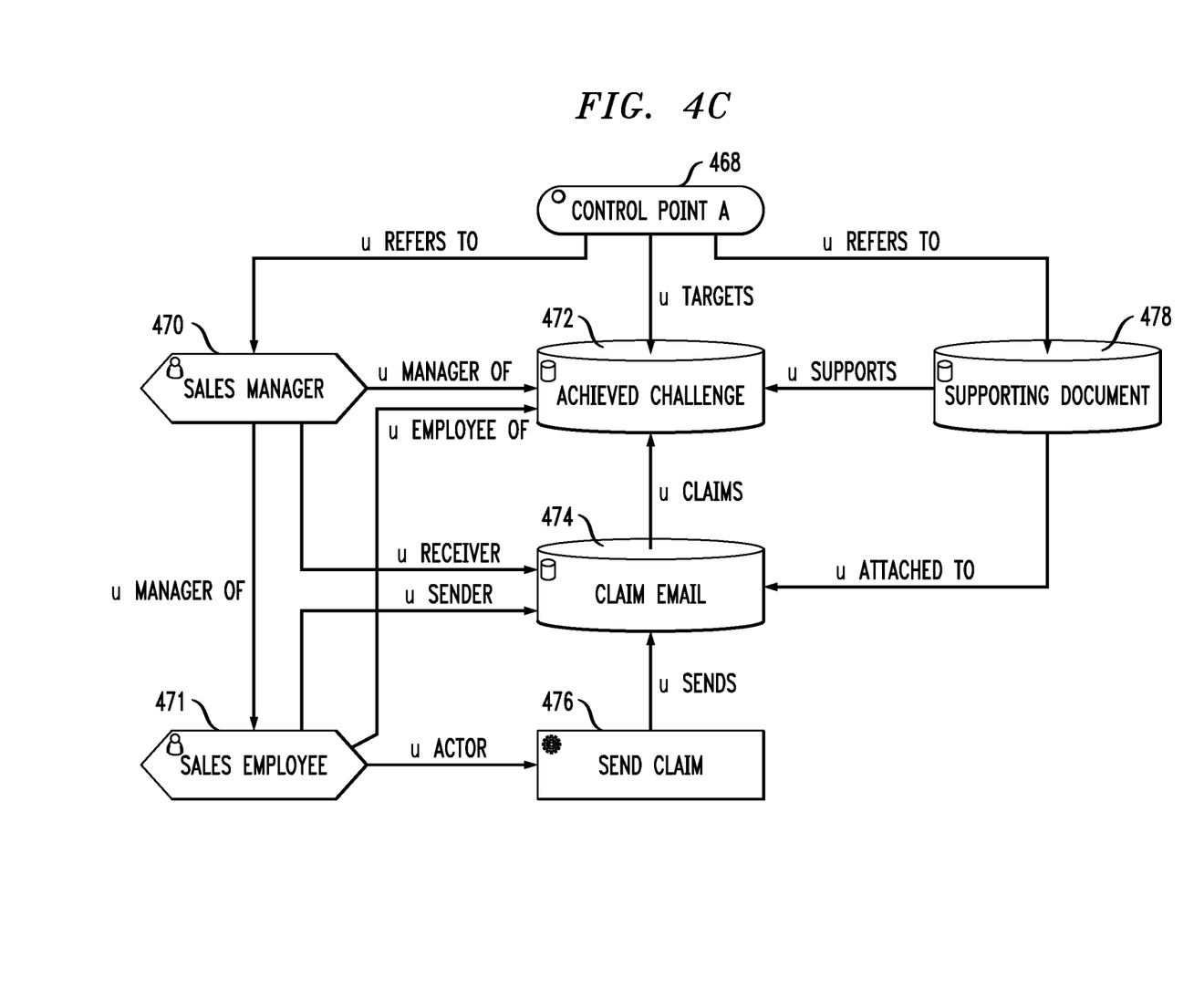
FIG. 4C illustrates a provenance sub-graph that represents a control-point, according to an embodiment of the invention.

The provenance sub-graph of FIG. 4C shows how to represent a control point (in particular, control point A shown in FIG. 4A) which indicates a requirement that sales manager must obtain and review the supporting document that supports the achieved challenge. Representing control points at the IT level enables computing compliance automatically.

More particularly, with respect to the scenario in FIG. 4A, the corresponding task record is represented in the sub-graph of the control point (468) in FIG. 4C as SendClaim node 476. Further, the corresponding resource records are represented as SalesManager node 470 and SalesEmployee node 471. Corresponding data records are represented as AchievedChallenge node 472, ClaimEmail node 474, and SupportingDocument node 478. Again, the diamond shapes on the edges between nodes represent the corresponding relation records. For the sake of simplicity, they have not been separately numbered since their specific relationships to the nodes they attach are dependent on the process being modeled (and fully understood from the scenario explained above in the context of FIG. 4A).

Figure 5:
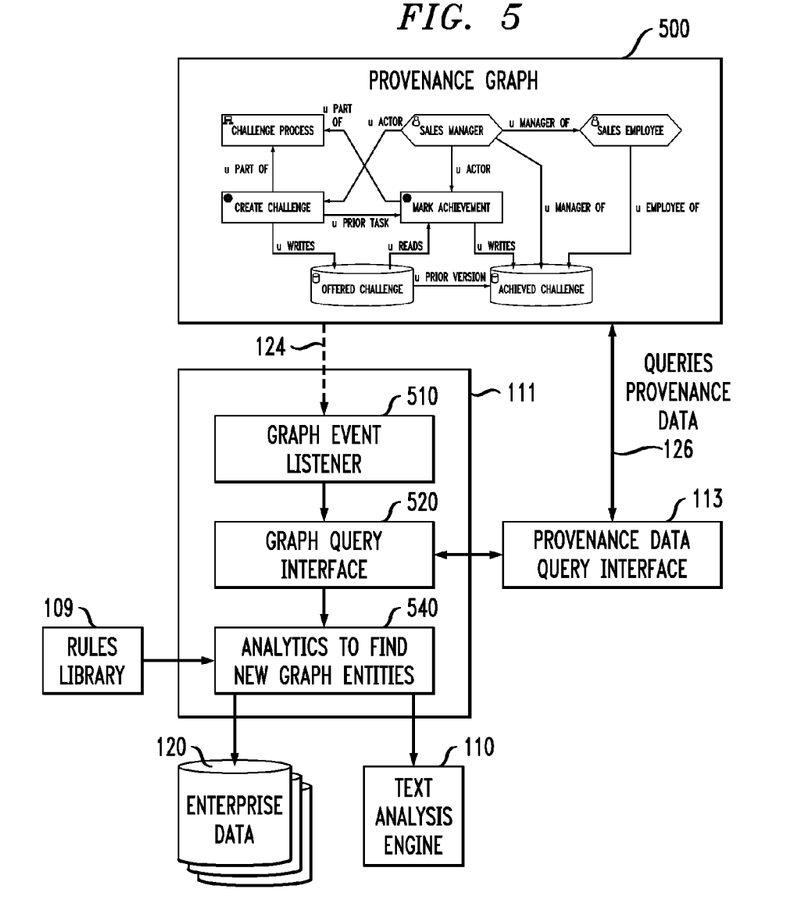
FIG. 5 illustrates a provenance graph enrichment process, according to an embodiment of the invention.

FIG. 5 shows the process of enriching the provenance graph. Provenance graph 500 is enriched by finding the relations among existing provenance records and discovering the new ones. The relations among the provenance records are defined by the rule files stored in the rule library 109. As an example, a simple rule may indicate that if the value of "From" field of an e-mail document is equal to the e-mail address of a person record, "sender" relation is set between the e-mail DataRecord and the person ResourceRecord. For every new item created in the graph, provenance graph enrichment engine 111 is notified via a graph event listener 510. The attributes of these newly created records are queried through graph query interface 520 and the received information is passed to the analytics component 540.

The main function of the analytics is to find relations or new records by computing the rules stored in the rules library 109 over the attributes of provenance records. Existing enterprise data 120 could also be used to find new relations, such as management or organizational relations. Text analysis engine 110 is employed when rules require the analysis of an unstructured content.

Figure 6:
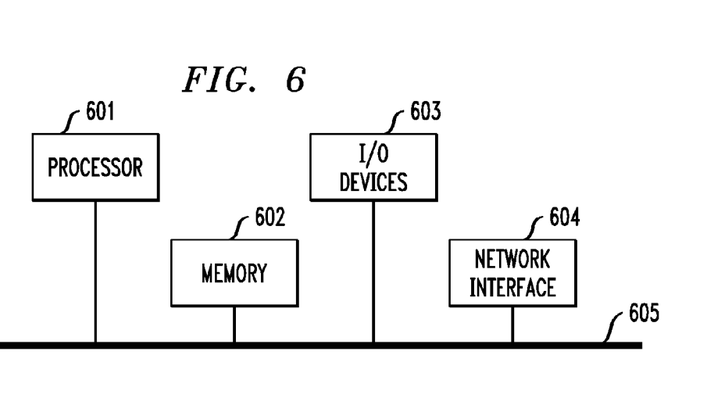
FIG. 6 illustrates a computer system in accordance with which one or more components/steps of the techniques of the invention may be implemented, according to an embodiment of the invention.

Lastly, FIG. 6 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 6 may represent one or more of the components/steps shown and described above in the context of in FIGS. 1 through 5. For example, the computer system may be used to implement one or more of the components of the enterprise process information discovery system depicted in FIG. 1.

The computer system may generally include a processor 601, memory 602, input/output (I/O) devices 603, and network interface 604, coupled via a computer bus 605 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing a process associated with an enterprise, comprising the steps of:
    collecting data associated with an actual end-to-end execution of an enterprise process;
    generating provenance data based on at least a portion of the collected data, wherein the provenance data is indicative of a lineage of one or more data items;
    generating a provenance graph that provides a visual representation of the generated provenance data, wherein nodes of the graph represent records associated with the collected data and edges of the graph represent relations between the records; and
    storing the generated provenance graph in a repository for analyzing the enterprise process,
    wherein one or more of the steps of collecting, generating, and storing are performed by a computer.

2. The method of claim 1, wherein the step of collecting data associated with the actual end-to-end execution of the enterprise process further comprises probing a runtime system of the enterprise within which the process is executed.

3. The method of claim 1, wherein the step of generating the provenance data based on the collected data further comprises mapping the collected data onto a data model previously created to represent the enterprise process.

4. The method of claim 3, wherein the data model further comprises one or more provenance record types.

5. The method of claim 4, wherein the one or more provenance record types comprise a data record type wherein a data record comprises a representation of an enterprise artifact produced or changed during execution of an enterprise process.

6. The method of claim 4, wherein the one or more provenance record types comprise a task record type wherein a task record comprises a representation of an execution of one particular enterprise-related task.

7. The method of claim 4, wherein the one or more provenance record types comprise a process record type wherein a process record comprises a representation of one instance of an enterprise-related process.

8. The method of claim 4, wherein the one or more provenance record types comprise a resource record type wherein a resource record comprises a representation of a person, a runtime or a different kind of resource that is relevant to a selected scope of enterprise provenance.

9. The method of claim 4, wherein the one or more provenance record types comprise a custom record type wherein a custom record comprises a representation of a domain-specific artifact.

10. The method of claim 1, wherein the step of generating the provenance graph that provides the visual representation of the generated provenance data further comprises identifying at least one control point such that the provenance graph is generated from a perspective of the identified control point.

11. The method of claim 1, further comprising the step of receiving a query directed to the stored provenance graph.

12. The method of claim 1, further comprising the step of analyzing the stored provenance graph to determine a root cause of a condition in the enterprise process.

13. The method of claim 1, further comprising the step of updating the provenance graph as subsequent data associated with the enterprise process is collected.

14. Apparatus for managing a process associated with an enterprise, comprising:
    a memory; and
    a processor coupled to the memory and configured to: collect data associated with an actual end-to-end execution of an enterprise process; generate provenance data based on at least a portion of the collected data, wherein the provenance data is indicative of a lineage of one or more data items; generate a provenance graph that provides a visual representation of the generated provenance data, wherein nodes of the graph represent records associated with the collected data and edges of the graph represent relations between the records; and store the generated provenance graph in a repository for analyzing the enterprise process.

15. The apparatus of claim 14, wherein generating the provenance data based on the collected data further comprises mapping the collected data onto a data model previously created to represent the enterprise process.

16. The apparatus of claim 15, wherein the data model further comprises one or more provenance record types.

17. The apparatus of claim 16, wherein the one or more provenance record types comprise a data record type wherein a data record comprises a representation of an enterprise artifact produced or changed during execution of an enterprise process.

18. The apparatus of claim 16, wherein the one or more provenance record types comprise a task record type wherein a task record comprises a representation of an execution of one particular enterprise-related task.

19. The apparatus of claim 16, wherein the one or more provenance record types comprise a process record type wherein a process record comprises a representation of one instance of an enterprise-related process.

20. The apparatus of claim 16, wherein the one or more provenance record types comprise a resource record type wherein a resource record comprises a representation of a person, a runtime or a different kind of resource that is relevant to a selected scope of enterprise provenance.

21. The apparatus of claim 16, wherein the one or more provenance record types comprise a custom record type wherein a custom record comprises a representation of a domain-specific artifact.

22. An article of manufacture for managing a process associated with an enterprise, the article comprising a computer readable storage medium including program code which when executed by a computer performs the steps of:

collecting data associated with an actual end-to-end execution of an enterprise process;

generating provenance data based on at least a portion of the collected data, wherein the provenance data is indicative of a lineage of one or more data items;

generating a provenance graph that provides a visual representation of the generated provenance data, wherein nodes of the graph represent records associated with the collected data and edges of the graph represent relations between the records; and storing the generated provenance graph in a repository for analyzing the enterprise process.

* * * * *